United States Patent [19]

Naoi

[11] Patent Number: 5,689,347

[45] Date of Patent: Nov. 18, 1997

[54] SIGNAL PROCESSING APPARATUS

[75] Inventor: Masaaki Naoi, Yokosuka, Japan

[73] Assignee: Canon Kabushiki Kaisha, Tokyo, Japan

[21] Appl. No.: 609,952

[22] Filed: Mar. 4, 1996

[30] Foreign Application Priority Data

Mar. 3, 1995 [JP] Japan ................ 7-044183

[51] Int. Cl.$^6$ ................ H04N 1/04; H04N 1/203
[52] U.S. Cl. ................ 358/444; 358/445; 358/474; 358/494; 358/496
[58] Field of Search ................ 358/444, 404, 358/445, 474, 494, 496, 443, 471; 382/318

[56] References Cited

U.S. PATENT DOCUMENTS

| | | | |
|---|---|---|---|
| 4,743,974 | 5/1988 | Lockwood | 358/494 |
| 4,949,189 | 8/1990 | Ohmori | 358/474 |
| 5,270,838 | 12/1993 | Mita | 358/471 |
| 5,280,368 | 1/1994 | Fullerton | 358/474 |
| 5,280,545 | 1/1994 | Masuda | 382/318 |

*Primary Examiner*—Scott A. Rogers
*Attorney, Agent, or Firm*—Fitzpatrick, Cella, Harper & Scinto

[57] ABSTRACT

There is disclosed an image reading apparatus constructed by two line sensors, a reading circuit for reading out outputs of the two line sensors through different channels, memory units for storing image signals which were read out by the reading circuit, and a control unit for controlling so that the image signals stored in the memory units are read out at a speed higher than that upon storage, wherein the reading circuit reads the outputs of the two line sensors from the different channels while deviating the outputs by a predetermined time, respectively.

9 Claims, 14 Drawing Sheets

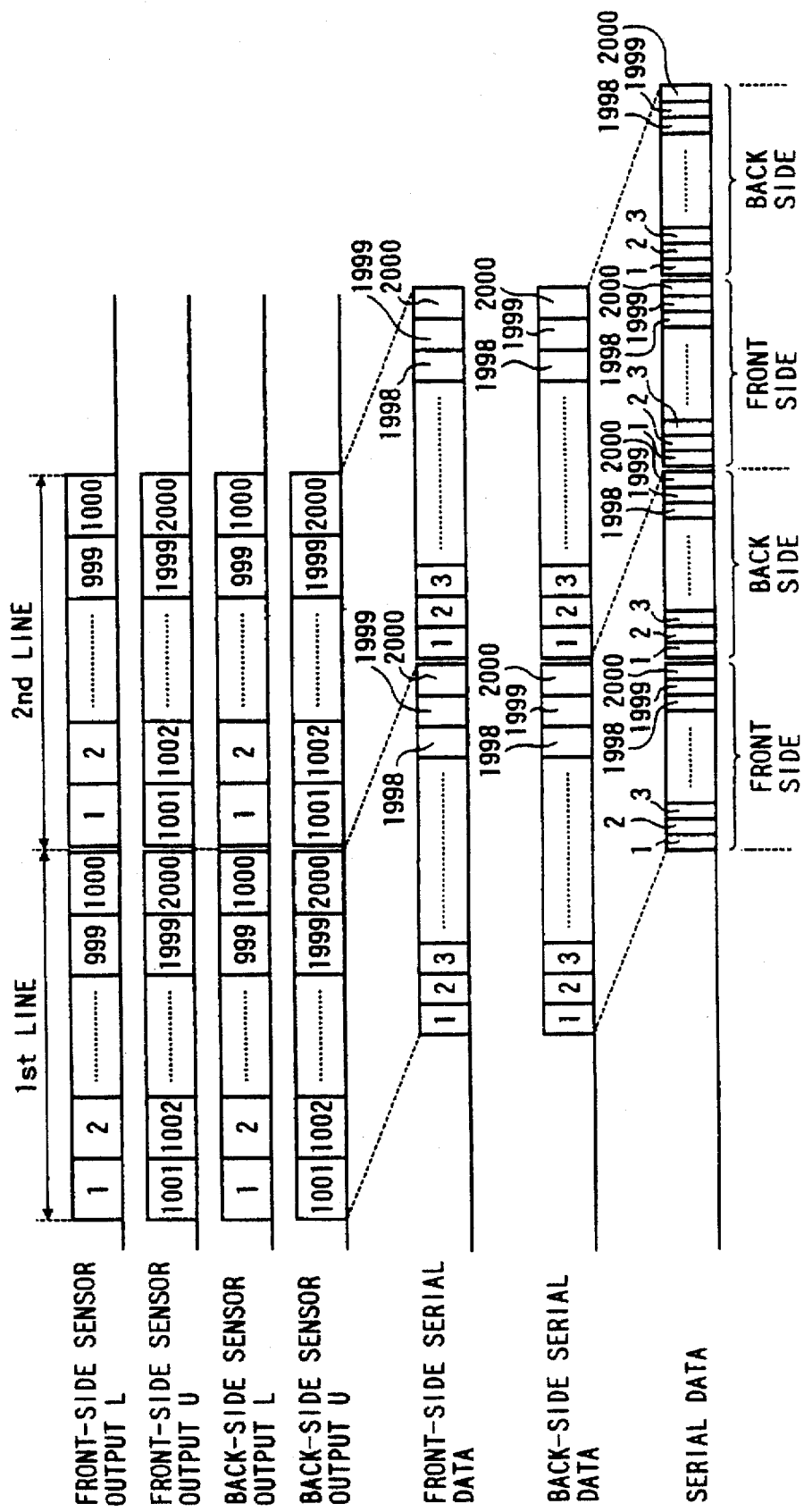

SIGNAL PROCESSING APPARATUS

BACKGROUND OF THE INVENTION

1. Field of the Invention

The invention relates to a signal processing apparatus for processing an input signal.

2. Related Background Art

In order to increase reading speed of an image reading apparatus using a linear image sensor, it is necessary to raise data speed of a serial data output of the linear image sensor. It is, however, difficult to realize a high data speed with a linear image sensor constructed by an analog circuit. Therefore, as a method of solving such problem, there is a method in which a light reception unit of a linear image sensor is divided into two portions, data is outputted from two output terminals and converted to data of double speed by an external circuit and, after that, the two data streams are synthesized into one, thereby realizing a high data speed.

FIG. 5 is a block diagram of a two-output linear image sensor of 2000 pixels. FIG. 6 shows a timing chart thereof. In FIG. 5, reference numeral 50 denotes a light reception unit; 51 a shift output unit for fetching light reception unit data of 1st to 1000th pixels by a shift signal and outputting to a sensor output L one pixel by one at every change point of a shift clock; 52 a shift output unit for similarly outputting light reception unit data of 1001st to 2000th pixels to a sensor output U pixel by pixel. The operation will now be described. In FIG. 6, when the shift clock is at the "H" level, the data of the 1st pixel is supplied to the sensor output L and the data of the 1001st pixel is supplied to the sensor output U. When the shift signal is set to the "L" level in association with a change in shift clock, the data of the 2nd pixel is outputted as a sensor output L and the data of the 1002nd pixel is outputted as a sensor output U and, subsequently, the data is sequentially outputted pixel by pixel at every change point of the shift clock.

FIG. 7 is a block diagram of a data synthesizing unit in the case where the data speed is doubled by using the two-output linear image sensor. FIG. 8 shows a timing chart thereof.

In FIG. 7, reference numeral 70 denotes a two-output linear image sensor, in which an output is digitized data. Reference numerals 71 and 72 denote memories which can accumulate the sensor output data of one line. Reference numeral 73 denotes a synthesis circuit to select either of the two data outputs in accordance with a selection signal.

In FIG. 7, the sensor outputs L and U of the linear image sensor 70 are simultaneously written into the memories 71 and 72 pixel by pixel, respectively. At a time when data has been written to an amount of only ½ of one line, the reading operation is started at a speed two times as high as a writing speed from the memory 71 on the sensor output L side. After completion of the reading of one line, the reading operation is stopped and, subsequently, the data is similarly read out at a speed of two times as high as the writing speed from the memory 72 on the sensor output U side. The data which are alternately outputted from the memory outputs L and U are multiplexed to one serial data stream by the synthesis circuit 73. As shown in the time chart in FIG. 8, in case of converting two data streams to serial data of the double speed, at a time point when the data from the sensors has been written into the ½-line memory, the data from the first pixel is sequentially read out at the double speed. Thus, even if the next line is continuously made operative, the double speed of the sensor can be realized without any problem.

FIG. 9 is a block diagram of a data synthesizing unit in the case where two linear image sensors of a serial output are used and one of the sensors is used to read out the front side of an original and the other is used to read out the back side of the original. FIG. 10 shows a timing chart for the data synthesizing unit.

In FIG. 9, in the case where a data speed of the sensor output and a speed of the serial data coincide, since it is necessary to alternately output a front-side sensor output and a back-side sensor output one by one, an original reading speed is ½ of that in the case of reading one side when the serial data speed and sensor output data speed are equal.

Therefore, in order to make a both-side simultaneous reading speed coincide with a one-side reading speed, it is necessary to double the data speed of the sensor or to double the serial data speed when a serial synthesization is performed.

FIG. 11 is a block diagram of a conventional example in case of performing a synthesis of front side data and back side data by only a multiplexing circuit as a conventional example in the case where the operation is performed at a serial data speed which is four times as high as the sensor output data speed in a manner such that when the front and back sides of an original are simultaneously read by using two 2-output linear image sensors, the reading operation can be theoretically performed at a speed that is four times as high as the speed when both sides are read by the conventional serial output sensor. FIG. 12 shows a timing chart for FIG. 11. In FIG. 12, when the data from the four sensor outputs is written into a memory to an amount of ¾ line, the data is sequentially read out from the data of the front-side sensor output L at a speed which is four times as high as the writing speed. The above data is selected by a synthesization circuit 7 and is set to the serial data. FIG. 13 is a block diagram for a case of synthesizing the front-side data and back side data by a construction comprising a memory and a synthesis circuit as another conventional example. FIG. 14 shows a timing chart for FIG. 13. The data of the sensor output L and sensor output U of each side is once synthesized with the front-side serial data and back-side serial data of a double speed, respectively. After that, the resultant data is further converted to serial data of the double speed (a speed four times as high as the sensor output data speed), thereby setting the data speed to a four-times speed.

However, according to the conventional example in FIGS. 11 and 12, at a time when the whole pixel data of the first line has been written into the memory, since only the pixel data of ¼ (the data of the 1st to 1000th pixels on the front side) of the first line is read, the data of the second line cannot be written until the data of ¾ (the data of all of the 1st to 2000th pixels on the front side and the data of the 1st to 1000th pixels on the back side) is read out. Since ½ line of the sensor output is necessary for the waiting time, even if the serial data speed is set to be four times as high as the sensor data speed, the reading speed which is four times as high as the conventional reading speed cannot be realized due to the waiting time. The reading speed is increased to only a speed of about 2.7 times. Therefore, an effect of the speed-up of the reading speed is small.

According to a conventional example in FIGS. 13 and 14, since the waiting time between lines as shown in the conventional example in FIGS. 11 and 12 is unnecessary, the reading speed can be doubled over the conventional speed. However, since an expensive memory which is 1.5 times as large as the conventional memory is necessary, there is a drawback in that the costs are high.

SUMMARY OF THE INVENTION

It is an object of the invention to provide an image reading apparatus which can process a read signal at a high speed.

In order to solve the above object, according to an embodiment of the invention, there is provided an image reading apparatus comprising: two line sensors; reading means for reading out outputs of the two line sensors through different channels, respectively; memory means for storing image signals read out by the reading means, respectively; and control means for controlling such that the image signals stored in the memory means are read out at a speed higher than a speed upon storing, wherein the reading means is constructed in a manner such that the outputs of the two line sensors are deviated by a predetermined time and are read out from the different channels.

By constructing as mentioned above, the image signals which are outputted from the two line sensors can be read out at a high speed without increasing a capacity of the memory means.

The above and other objects and features of the present invention will become apparent from the following detailed description and the appended claims with reference to the accompanying drawings.

BRIEF DESCRIPTION OF THE DRAWINGS

FIG. 14 is a timing chart for the conventional image reading apparatus.

DETAILED DESCRIPTION OF THE PREFERRED EMBODIMENTS

Figure 1:
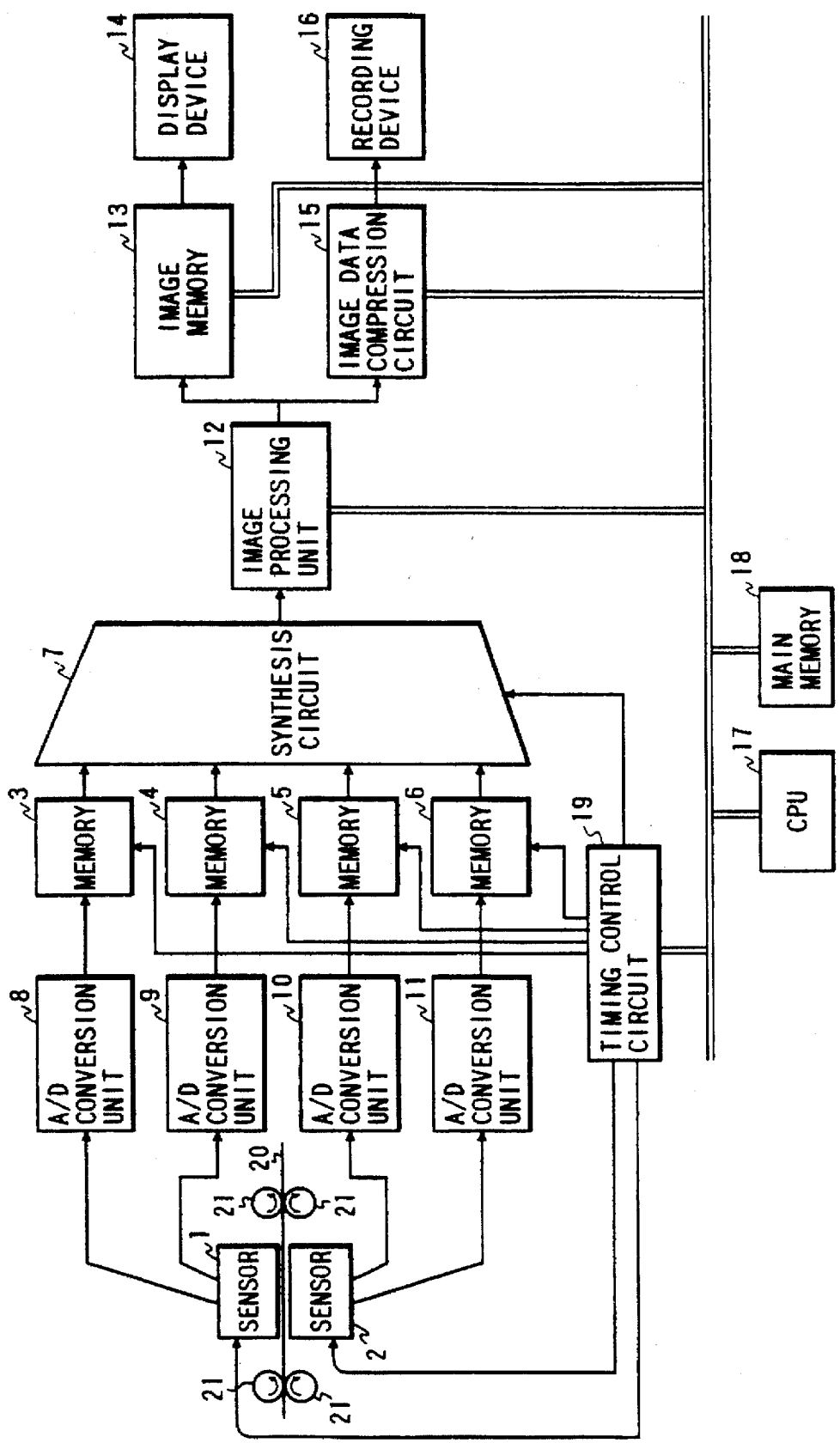
FIG. 1 is a constructional block diagram of an image reading apparatus according to an embodiment 1 of the invention.

FIG. 1 shows a block diagram of an image reading apparatus serving as a signal processing apparatus which can simultaneously read both sides of an original according to the first embodiment of the invention. In FIG. 1, reference numeral 1 denotes a linear image sensor for reading out a front side of the original while scanning one line by one, dividing one line into two portions, and outputting to two outputs by analog signals pixel by pixel, respectively; 2 a sensor which reads out a back side of the original and has the same construction as the sensor 1; 8 to 11 A/D conversion units for converting the analog signals of the four outputs from the sensors 1 and 2 into digital multi-value signals; 3 to 6 memories which store the digitized image data and each of which has a data capacity of one line of the sensor output in which the image data of one line can be read out at an arbitrary timing at a speed of four times as high as a storing speed; 7 the synthesis circuit for sequentially synthesizing the image data from the memories 3 to 6 one line by one and serially outputting every pixel; 12 an image processing unit for correcting digital synthesized image data or performing a binarization; 13 an image memory for storing an image of one page of the original; 14 a display device for displaying the read original image onto a display or the like; 15 an image data compression circuit for compressing the binarized image data; 16 a recording device for recording compression data to a, memory medium such as a magnetooptic disk or the like; 17 a CPU for controlling the apparatus main body; 18 a main memory for storing data or the like necessary for control; 19 a timing control circuit serving as phase displacement means and driving means for forming a signal to control the operations of the component elements from the sensors 1 and 2 to the synthesization circuit 7 as in the present invention; 20 an original to be read; and 21 rollers for conveying the original.

Figure 2:
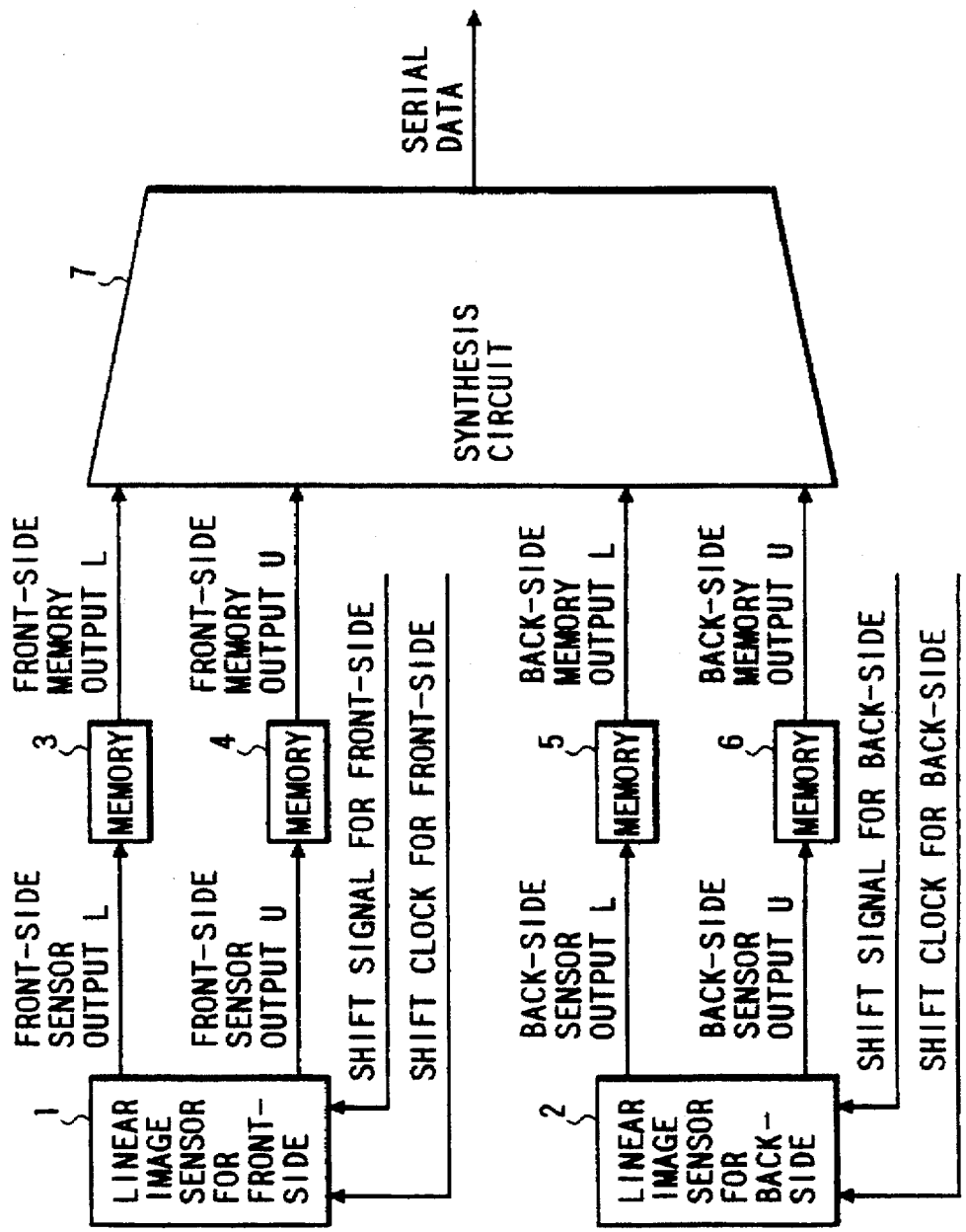
FIG. 2 is a constructional block diagram of an image synthesizing unit according to the embodiment 1 of the invention.

Subsequently, FIG. 2 shows a construction in a range from the image sensors to the synthesization circuit (the A/D conversion unit is omitted) in the embodiment and will now be described in detail with reference to a timing chart of FIG. 3.

In FIG. 2, reference numeral 1 denotes the linear image sensor (line sensor) of 2000 pixels for reading out the front side of the original surface one line by one, dividing one line into two portions by a shift signal for the front side, and serially outputting the data of the 1st to 1000th pixels as digital data to the front-side sensor output L and the data of the 1001st to 2000th pixels to the front-side sensor outputs U as digital data one pixel by one synchronously with a shift clock for the front side. Reference numeral 2 denotes the linear image sensor which reads out the back side of the original and has the same specification as that of the linear image sensor for the front side and operates by a shift signal for the back side and the shift clock. The shift signals for the front side and the back side and the shift clock are supplied from the timing control circuit 19 shown in FIG. 1. Reference numeral 3 denotes the memory serving as memory means in which data can be simultaneously read out at a speed which is four times as high as a writing speed while writing the data of the front-side sensor output L; 4 to 6 the memories having the same function as the memory 3 for the data of the front-side sensor output U, back side sensor output L, and back-side sensor output U, respectively; 7 the synthesis circuit serving as synthesizing means for sequentially synthesizing the memory outputs of the memories 3 to 6 in accordance with the order of the front-side memory output L, front side memory output U, back side memory output L, and back-side memory output U one line by one and generating serial data for every pixel, pixel by pixel.

Figure 3:
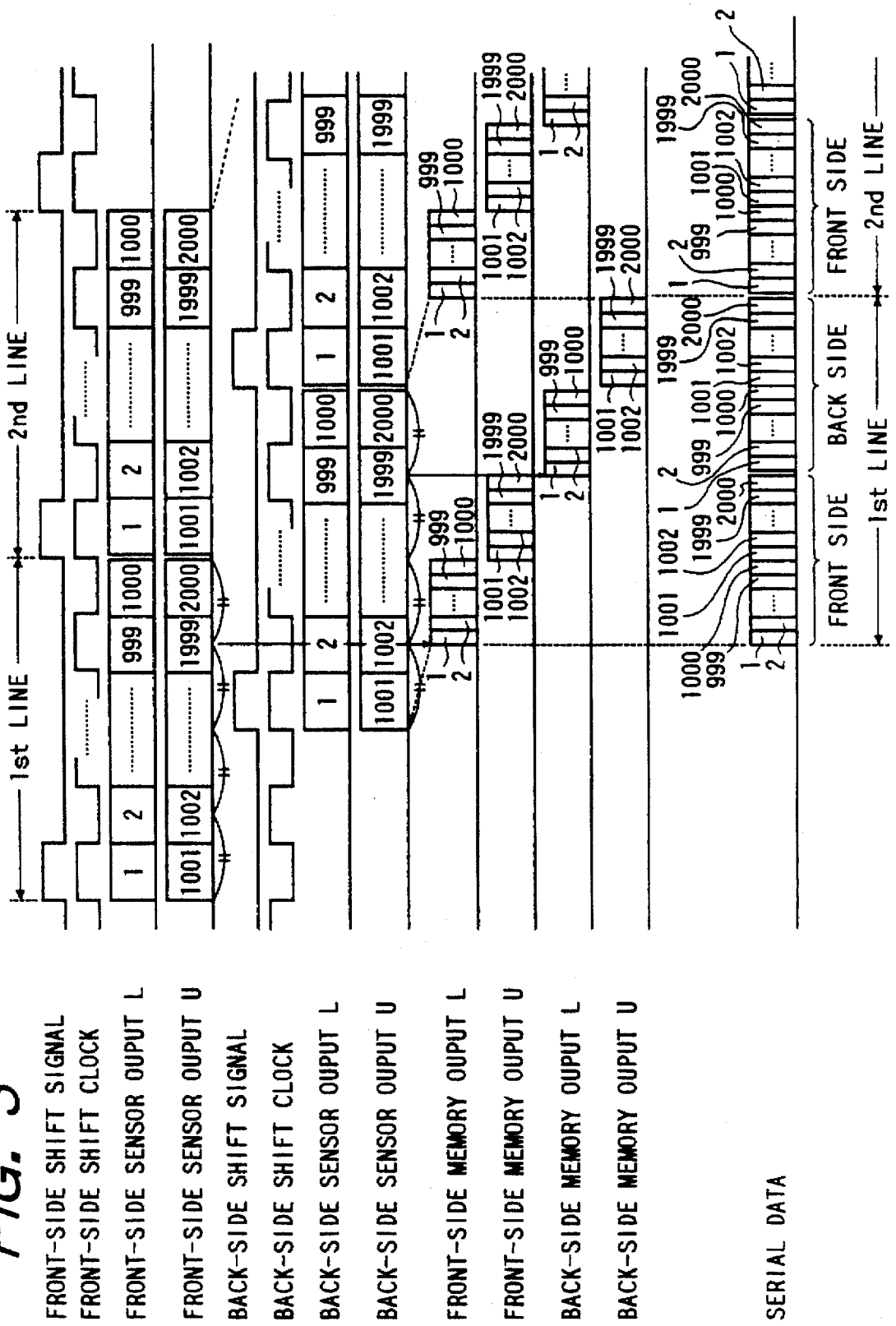
FIG. 3 is a timing chart for the image reading apparatus according to the embodiment 1 of the invention.

In FIGS. 2 and 3, when the front-side shift signal of the first line is supplied to the linear image sensor 1 for the front-side, the data is sequentially supplied to the front sensor output L from the 1st pixel and the data is sequentially supplied to the front-side sensor output U from the 1001st pixel and the data is written into the memories 3 and 4, respectively. When the shift signal for the back side of the first line to the linear image sensor 2 for the back side is shifted from the shift signal for the front side by the phase of ½ line and is applied, the data is sequentially supplied pixel by pixel to the back-side sensor output L from the 1st pixel with a delay time of ½ line for the front side, the data is similarly sequentially supplied to the back side sensor output U from the 1001st pixel pixel by pixel, and the data is written into the memories 5 and 6, respectively.

As mentioned above, the data written in the memories 3 to 6 is read out at a speed four times as high as the writing speed in accordance with the order of the memories 3, 4, 5, and 6 in a manner such that the data of one line in the memory 3 is read out and, subsequently, the data of one line in the memory 4 is read out, etc. The read-out data is synthesized with the serial data every pixel by the synthesis circuit 7, so that the data can be made into serial data in accordance with the order of the 1st to 2000th pixels at the front side and the 1st to 2000th pixels at the back side. However, the reading of the data of the first line from the memory has to be certainly executed between the writing of the first line and the writing of the second line with respect to all pixels. Therefore, the whole pixel data of the 1st to 2000th pixels of the first line is correctly read out by starting the reading of the front side from the memory 3 from the phase of ¾ line of the first line of the front side.

When the whole data of the first line of the front side is read out, since the data of the first line of the back side is written into the memories 5 and 6 with a delay time of ½ line from the front side, the data is written just at the phase of ¾ line of the first line of the back side. Therefore, if subsequently reading out the data of the back side from the memory 5, the whole pixel data of the 1st to 2000th pixels of the first line of the back side is correctly read out.

When the whole pixel data of the 1st to 1000th pixels of the first line of the front side is written into the memory 3, since the reading has just been completed, the data of the 1st to 1000th pixels of the 2nd line can be written into the memory 3. At a time when the whole data of the 1001st to 2000th pixels of the front side is written into the memory 4, the reading of the data of the 1001st pixel is just started. However, since the reading speed is four times higher than the writing speed, the data of the 2nd line can be written at the same time as the start of the reading of the data of the first line.

With respect to the data of the back side, since the timing is similar to that of the front side data, the data of the second line can be written into the memories 5 and 6 subsequently to the first line.

The two-output type sensors 1 and 2 are used and driven while deviating the timings for the front side and back side by ½ line as mentioned above, so that the data can be read out at a speed four times as high as that of the conventional reading apparatus in which the both sides are simultaneously read out by the one-output type sensor.

Although an apparatus using the two-output type image sensors has been described in the embodiment, the invention is not limited to the above example. The signal process can be executed at a high speed or a signal which is inputted by any method, by using a similar construction.

Figure 4:
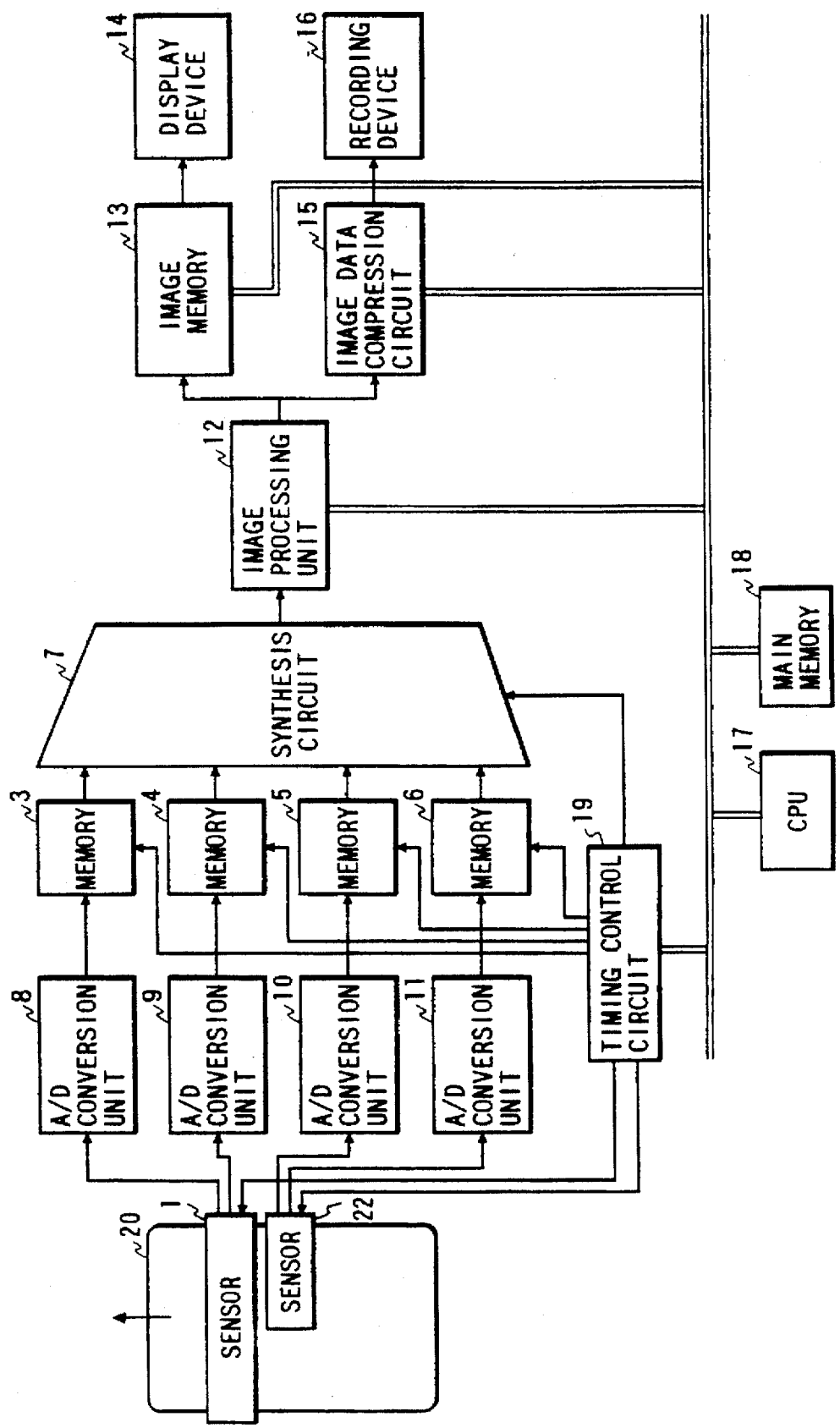
FIG. 4 is a constructional block diagram of an image reading apparatus according to an embodiment 2 of the invention.
Figure 5:
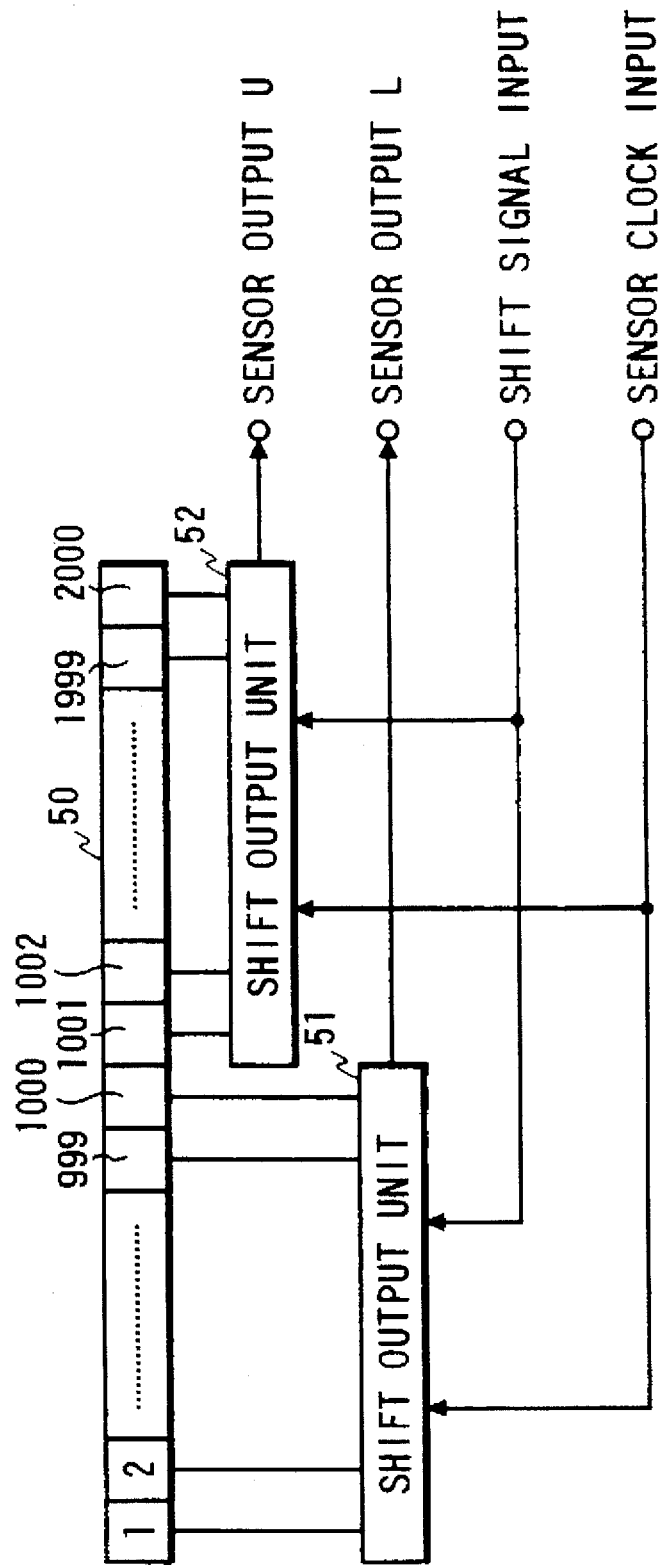
FIG. 5 is a constructional diagram of a two-output linear image sensor.
Figure 6:
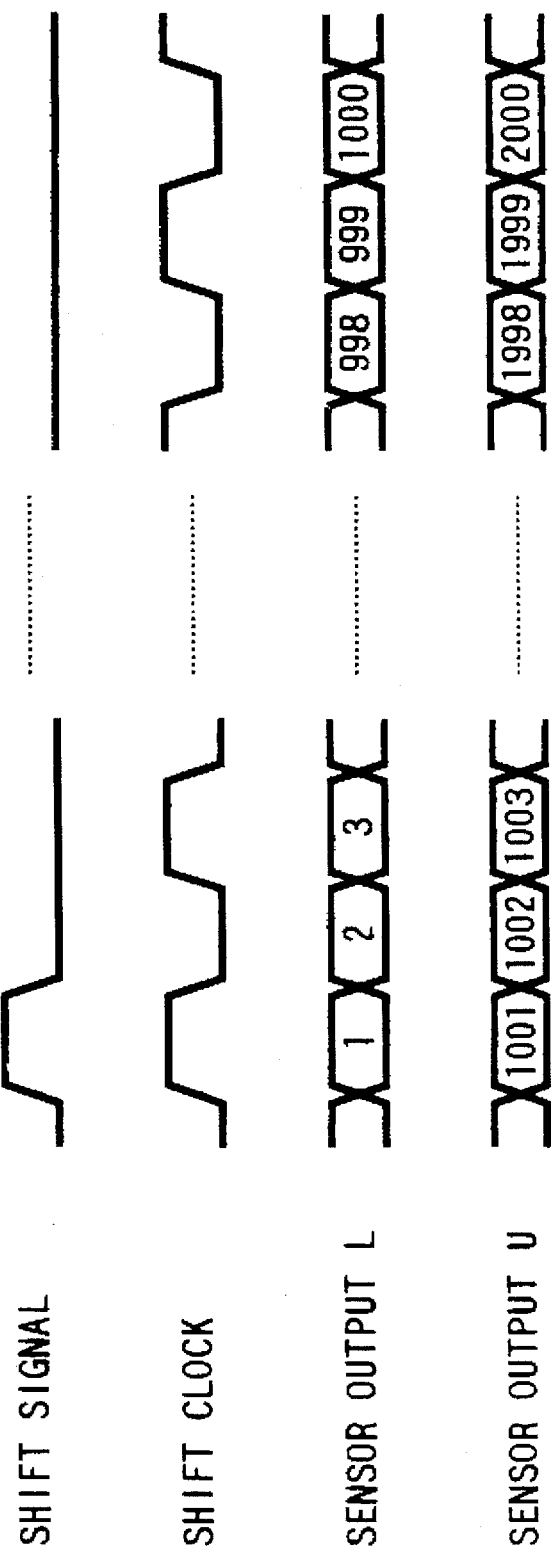
FIG. 6 is a timing chart for the two-output linear image sensor.
Figure 7:
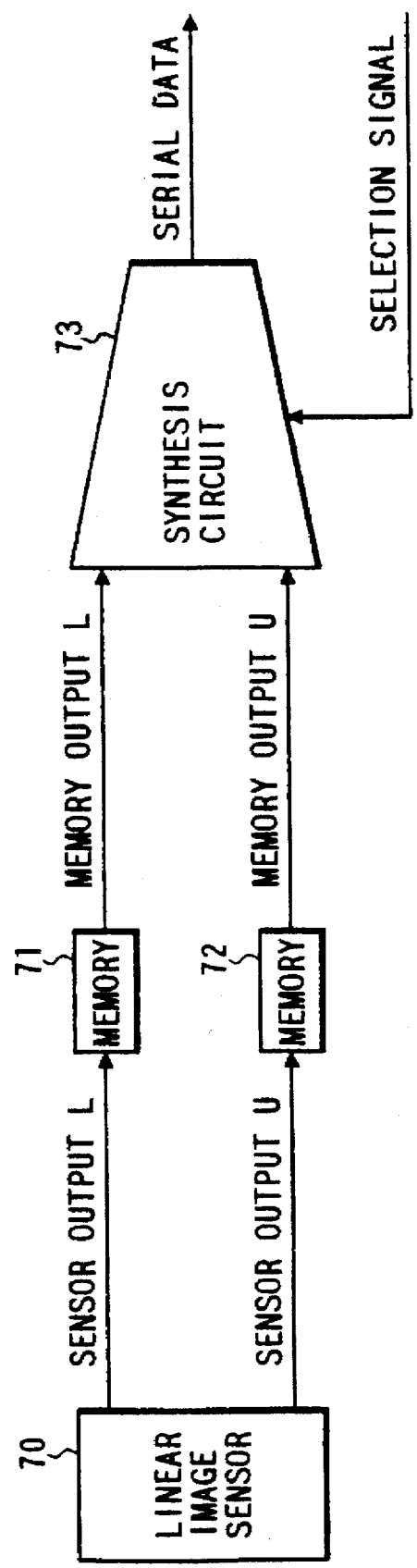
FIG. 7 is a constructional block diagram of a conventional image reading apparatus.
Figure 8:
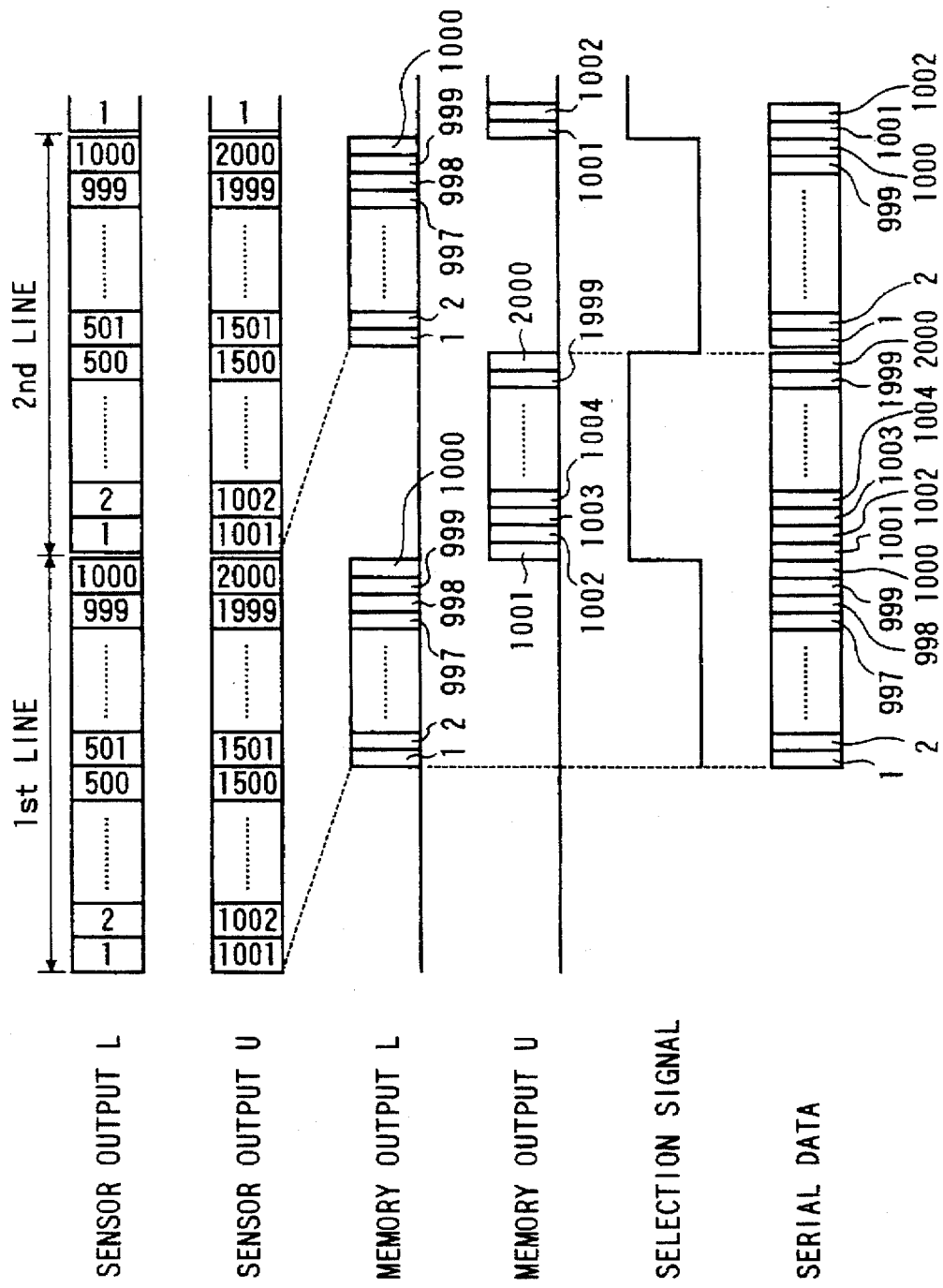
FIG. 8 is a timing chart for the conventional image reading apparatus.
Figure 9:
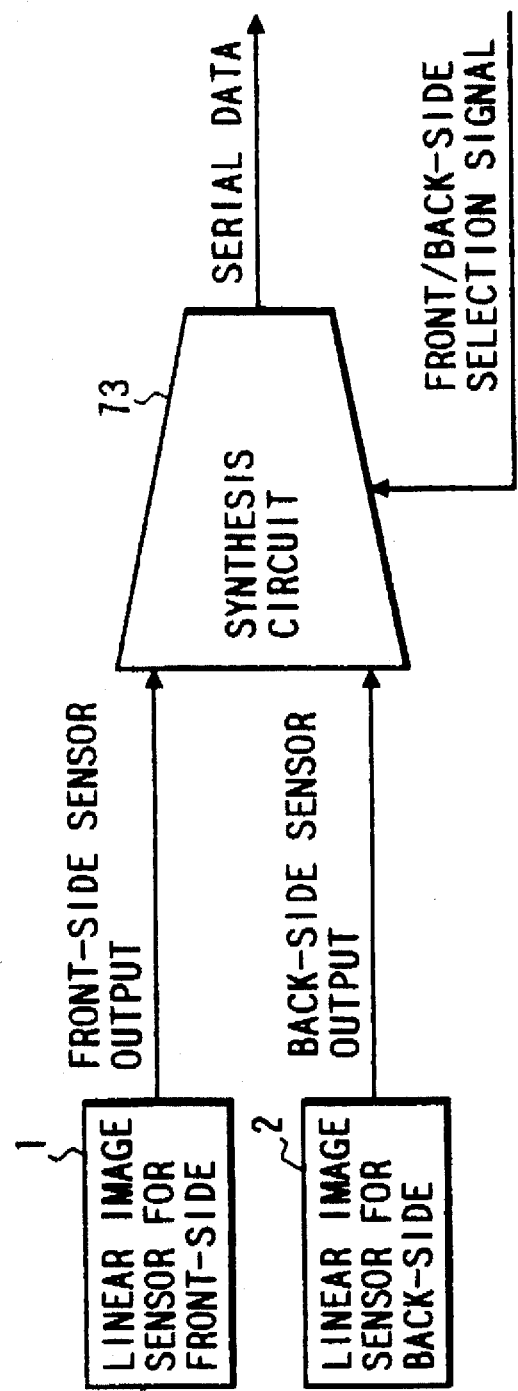
FIG. 9 is a constructional block diagram of the conventional image reading apparatus.
Figure 10:
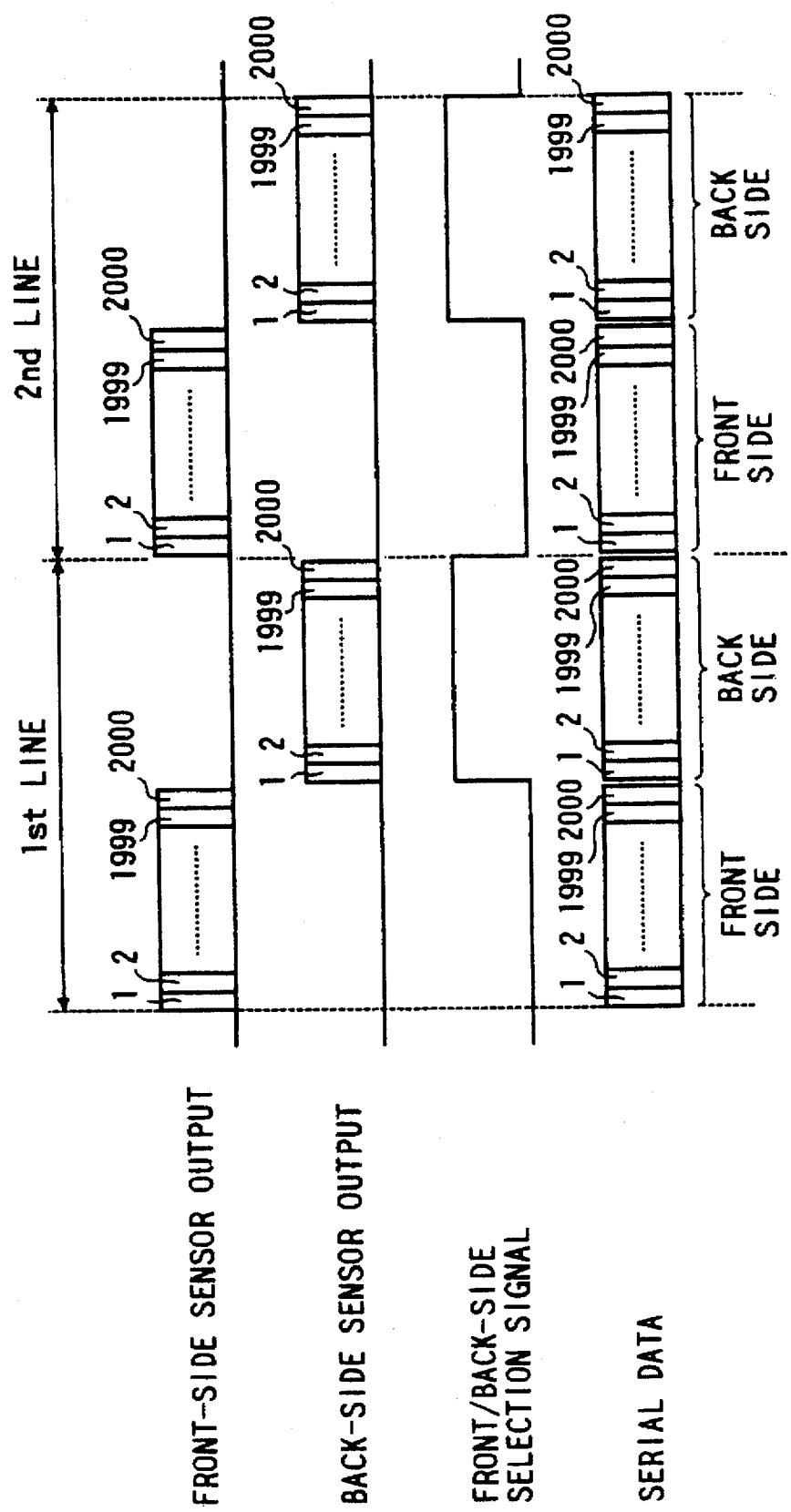
FIG. 10 is a timing chart for the conventional image reading apparatus.
Figure 11:
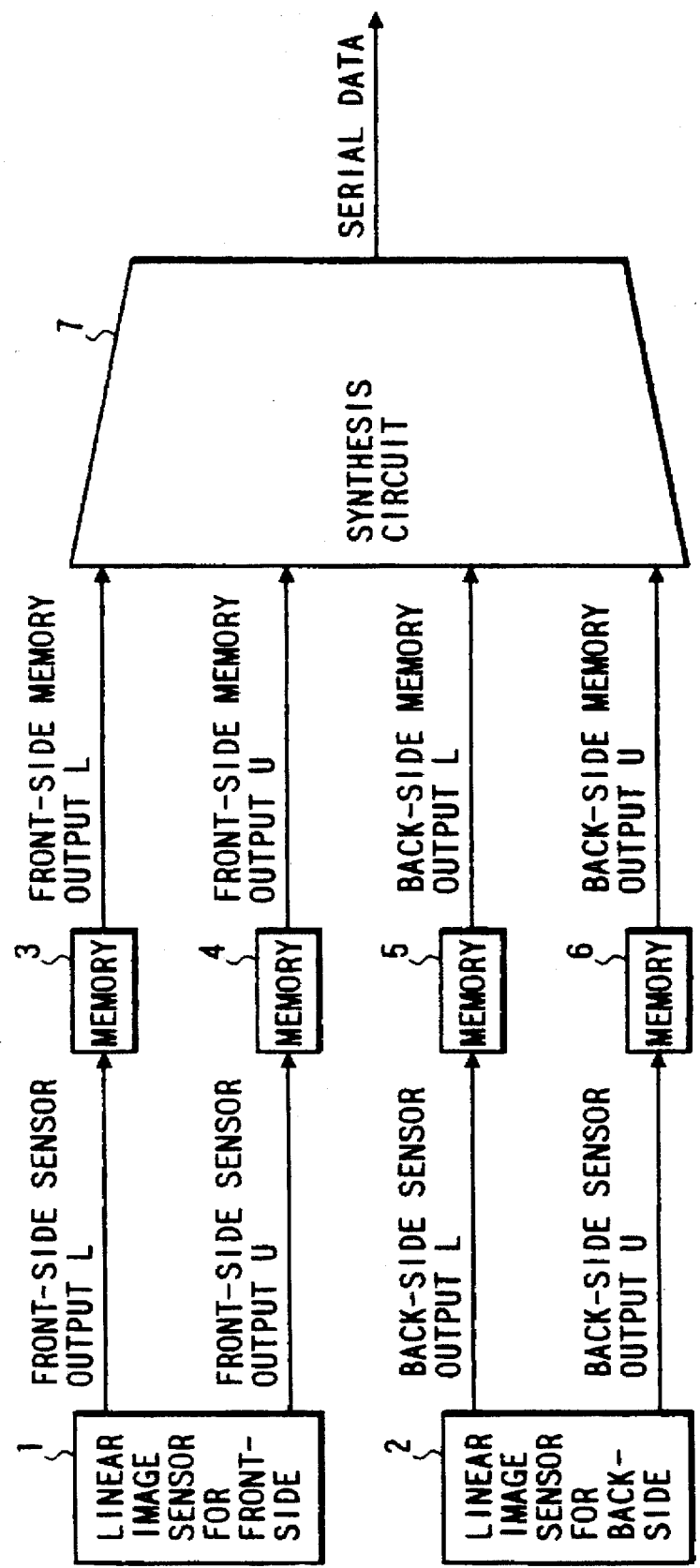
FIG. 11 is a constructional block diagram of the conventional image reading apparatus.
Figure 12:
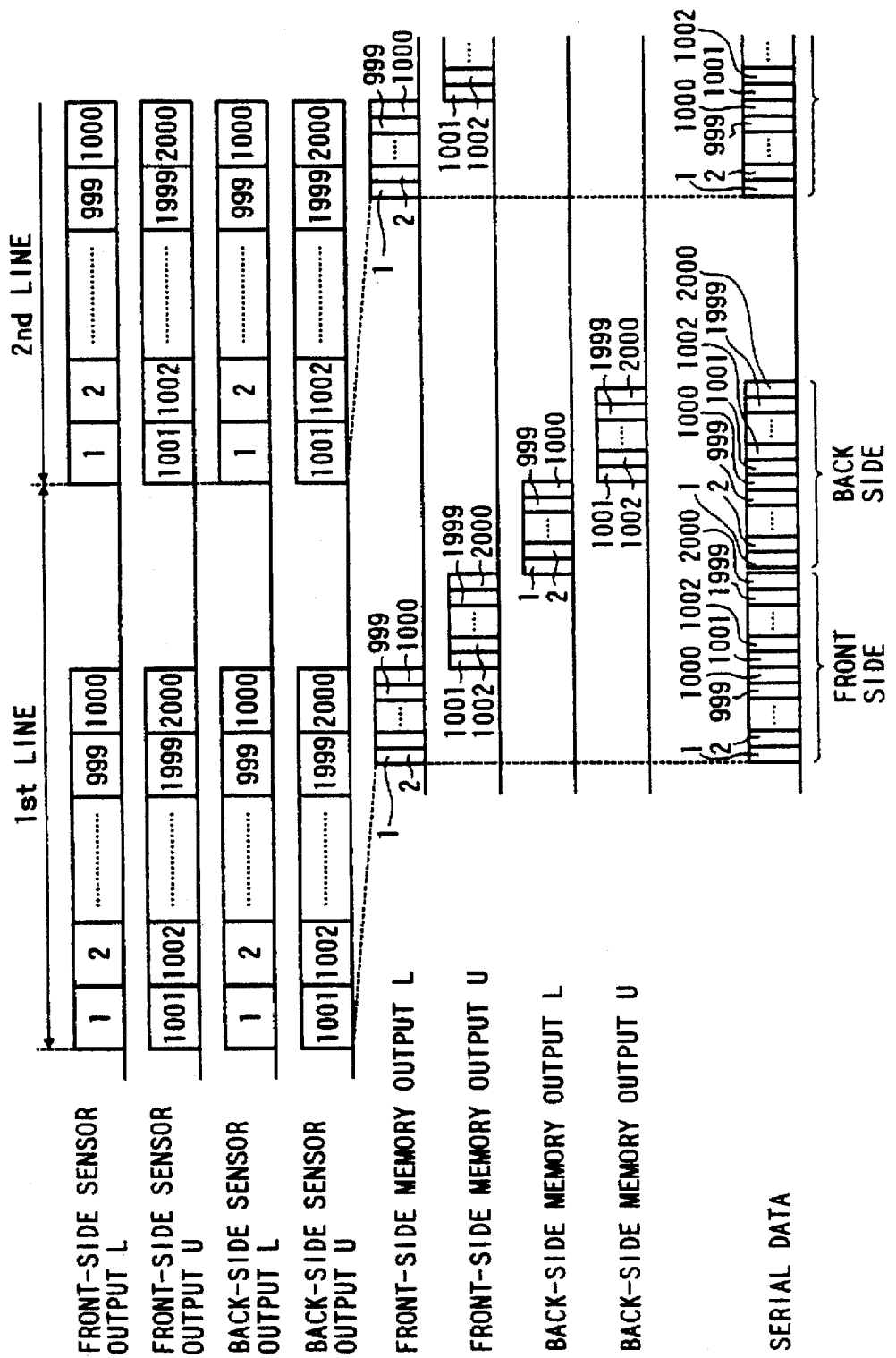
FIG. 12 is a timing chart for the conventional image reading apparatus.
Figure 13:
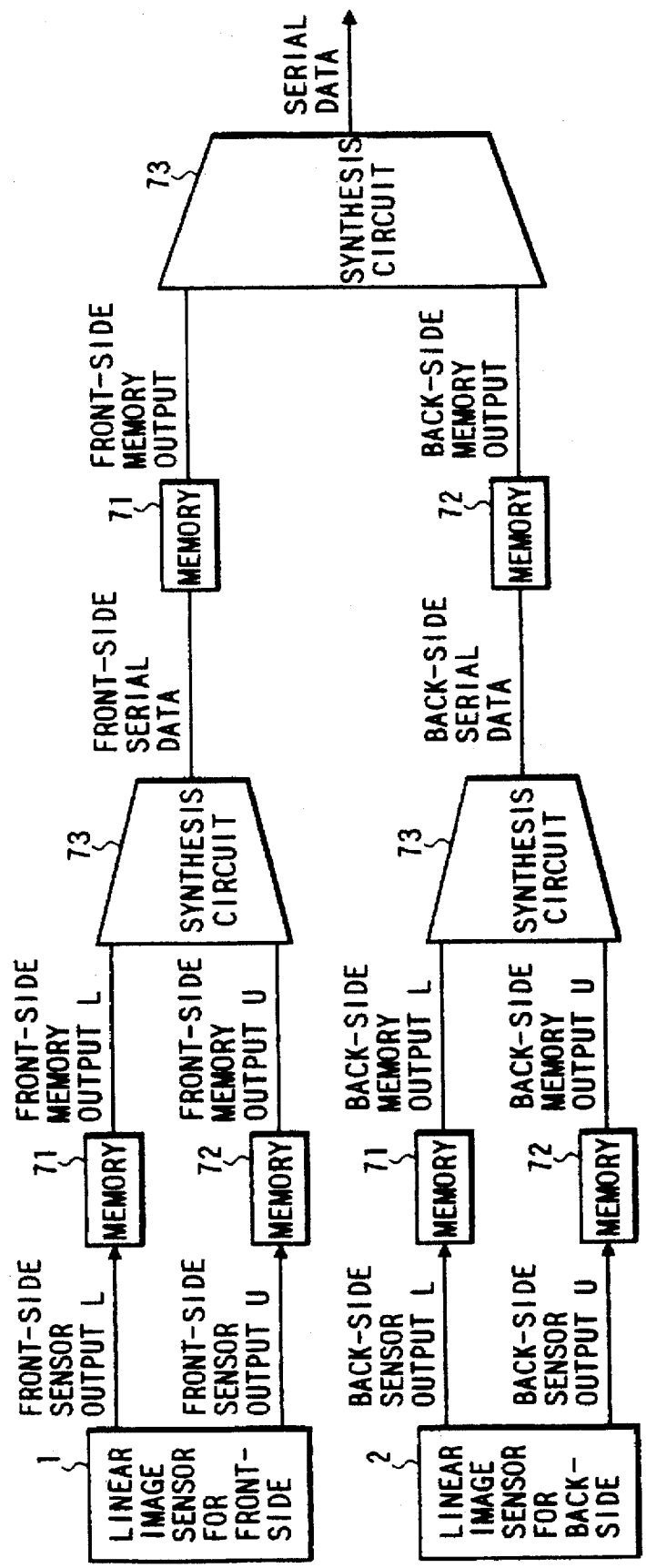
FIG. 13 is a constructional block diagram of the conventional image reading apparatus.

The embodiment 1 has been shown with respect to an example in which both sides of the original are simultaneously read out by using two linear image sensors of the same specification. Among the originals, there is a one-side original such that additional information such as a bar code or the like is attached to a part of the original. The additional information is limited to a small area on the original so as not to reduce the information capacity of the original more than necessary. Therefore, a sensor which can partially read data at a high resolution is used as a sensor to read the additional information. FIG. 4 shows a block diagram of an image reading apparatus using two sensors for reading an original and for reading additional information according to the second embodiment of the invention. The same component elements as those in FIG. 1 are designated by the same reference numerals and their descriptions are omitted.

In FIG. 4, reference numeral 22 denotes a sensor to read additional information written on the right side of the original 20 at a resolution higher than that of the sensor 1. The sensor 1 for reading the original and the sensor 22 for reading the additional information are two-output linear image sensors. In the case where the number of pixels per line of the sensor 22 is smaller than that of the sensor 1, the original is read out by driving the sensor 22 while deviating the phase by ½ line. Since the data can be continuously generated from the sensor 1 without waiting for a time between the lines, the serial data of every one pixel can be formed by the synthesis circuit 7 at a speed which is four times as high as the data speed of the sensor.

By constructing as shown in the embodiment 2, although the circuit for reading the original and the circuit for reading the additional information as well as the image processing unit are conventionally independent, the image processing unit can be commonly constructed as one circuit and the original can be read out at a double speed as compared with the conventional one-side reading.

What is claimed is:

1. An image reading apparatus comprising:

two line sensors;

reading means for reading out outputs of said two line sensors through different channels, respectively;

memory means for storing image signals read out by said reading means, respectively; and control means for controlling so that the image signals stored in said memory means are read out at a speed higher than that upon storage, wherein said reading means reads out the outputs of said two line sensors from said different channels while deviating said outputs by a predetermined time, respectively.

2. An apparatus according to claim 1, further comprising synthesizing means for synthesizing the outputs of said two line sensors which were read out from the memory means by said control means.

3. An apparatus according to claim 1, wherein said line sensors generate two-split outputs and said reading means reads out the outputs of said two line sensors in a manner such that they are deviated from each other by every ½ line.

4. An apparatus according to claim 1, wherein said two line sensors are a line sensor to read out a front side image of an original and a line sensor to read out a back side image of said original.

5. An apparatus according to claim 1, wherein said two line sensors have different resolutions.

6. An apparatus according to claim 1, wherein said two line sensors are a line sensor to read out a whole area of an original and a line sensor to read out a part of said original.

7. An apparatus according to claim 6, wherein said two line sensors have different resolutions.

8. An apparatus according to claim 6, wherein said line sensor to read out a part of said original reads out an additional information of the original.

9. An apparatus according to claim 8, wherein said two line sensors have different resolutions.

* * * * *